C. F. MEISSNER.
TOBACCO PIPE.
APPLICATION FILED JAN. 9, 1917.
1,249,984.
Patented Dec. 11, 1917.
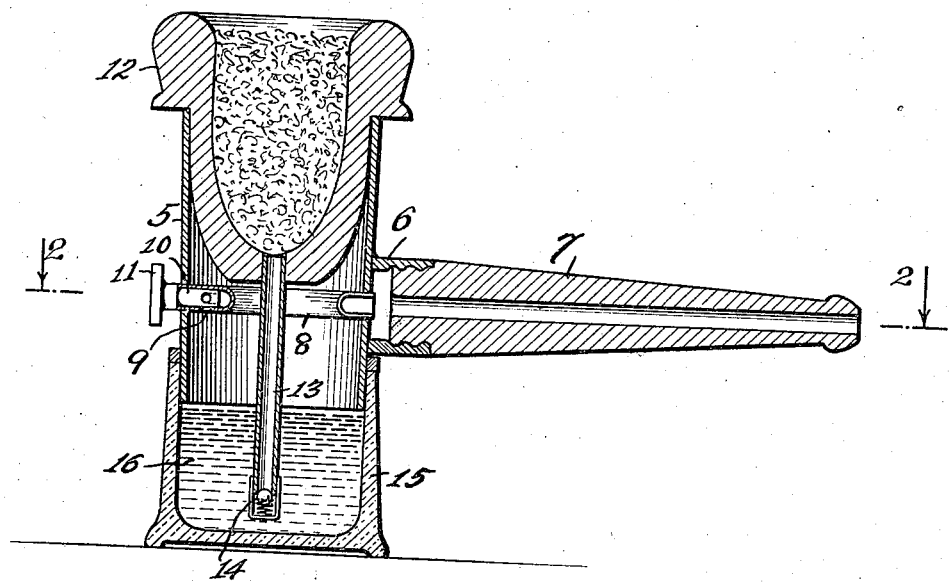
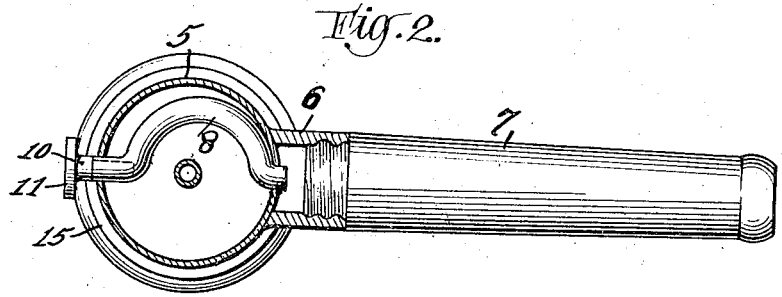
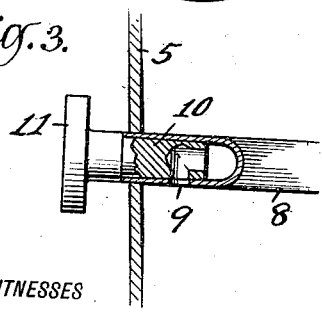
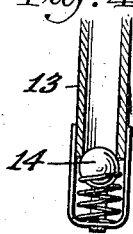
WITNESSES
Frederick Diehl
J. C. Larsen
INVENTOR
C. F. Meissner
BY Munn & Co
ATTORNEYS

UNITED STATES PATENT OFFICE.

CHARLES F. MEISSNER, OF BROOKLYN, NEW YORK.

TOBACCO-PIPE.

1,249,984.  Specification of Letters Patent.  Patented Dec. 11, 1917.

Application filed January 9, 1917. Serial No. 141,379.

*To all whom it may concern:*

Be it known that I, CHARLES F. MEISSNER, a citizen of the United States, and a resident of New York, borough of Brooklyn, county of Kings, and State of New York, have invented certain new and useful Improvements in Tobacco-Pipes, of which the following is a specification.

My invention relates to pipes for smoking tobacco and is of the well known hooka or hubble-bubble type, one of the main objects thereof being to provide a pipe having the advantages of a hooka and at the same time being used in the manner of conventional pipes because of its portability.

My invention is fully described in the following specification, of which the accompanying drawings form a part, in which like characters refer to like parts in each of the views, and in which:—

Figure 1 is a sectional view taken through one embodiment of a pipe constructed in accordance with my invention;

Fig. 2 is a plan view partly in section in a plane corresponding with the line 2—2 of Fig. 1.

Fig. 3 is a fragmentary view similar to Fig. 1 but showing a detail in section, enlarged; and Fig. 4 is a sectional view of a check valve shown in Fig. 1.

Referring to the drawings, 5 represents a substantially cylindrical body member having an internally threaded nipple 6 at one side thereof adapted to receive a mouthpiece or stem 7, there being no communication, however, between the interior of the body member 5 and the interior of the nipple, directly, a tube 8 within the body member being introduced into the interior of the nipple at one end and extended outwardly of the body member at its other end, a port 9 being provided adjacent the latter end, interiorly of the body member.

Rotatably seated in the ported end of the tube 8 is a plug 10, provided with a knob 11, and having an axial and a lateral passage connected with each other, the former being in communication with the stem 7 through the tube 8 and the latter being adapted to be brought into register with the port 9 in said tube by the rotation of the plug, said plug thus acting as a rotary valve.

Detachably seated in the top of the body member 5 is a tobacco bowl 12 of any desired material or design, said bowl having a tube 13 extended downwardly therefrom and the lower end of which is provided with a check valve 14 permitting downward movement of air but preventing upward movement of air or water.

Detachably seated in or on the lower end of the body member 5 is a water receptacle 15 of any desired design though preferably with a flat bottom whereby the body member and water receptacle may be maintained in upright position upon a table or the like, the connections between the body member and bowl 12, and between the body member and the water receptacle 15, being air and water-tight, either by a steam-tight fit or by suitable packings or gaskets.

When water is placed within the receptacle 15 of a sufficient depth to cover the check valve 14, and it is desired to use the pipe, the plug 10 is rotated to bring the lateral passage therein into register with the port 9, thereby placing the space between the bowl 12 and the level of the water 16 in direct communication with the passage through the stem 7, and, when the bowl 12 is filled with tobacco and the latter ignited, outward suction through said stem will produce a partial vacuum in the space within the body member with the result that smoke laden air will be drawn through the tube 13 and check valve 14, upwardly through the water for cooling and for the removal of tar and oils from the smoke, as well as any particles of tobacco, and the cleansed and cooled air and smoke then passes through the port 9, tube 8, and stem 7, to the mouth of the smoker.

Because of the relatively great height of the body member with respect to the depth of water, the pipe may be held at a considerable angle without fear of the water entering the port 9, the check valve 14 preventing upward movement of the water in the bowl pipe or tube 13 and, when it is desired to carry the pipe in the pocket, all that is necessary is to rotate the plug 10 to carry its lateral passage out of register with the port 9, thus imprisoning the water within the body member 5 and the receptacle 15.

While I have shown an entirely practical embodiment of my invention, it will be obvious that many changes may be made thereover, provided such changes do not depart from the spirit of the invention, and come within the scope of the appended claims.

Having fully described my invention, what I claim as new, and desire to secure by Letters Patent, is:—

1. A pipe of the class described including a body having a tobacco bowl at the top and constituting in its lower portion a water chamber, a stem on the body above the water level of said chamber and out of direct communication with the bowl, a smoke tube extending from the bowl into the water chamber below the water level thereof, a tube extending transversely through the water chamber above the water level and from the stem through the opposite side of the body, said transverse tube having a lateral opening into the water chamber, and a valve fitting the end of the transverse pipe opposite the stem and operable from the exterior of the pipe body to control said lateral opening.

2. A pipe of the class described, comprising a tobacco bowl, a substantially cylindrical body member supporting the same closed at its sides and open at top and bottom, a nipple at one side thereof, a stem held in said nipple, a water receptacle held on said body member, a tube provided with a check valve extended downwardly from said bowl beneath the level of the water in said receptacle, a tube passed through opposite sides of said body member connected at one end with said stem and at the other end with the pipe exterior, said tube having a port adjacent said last named end interiorly of said body member, and a manually operable valve for said port.

CHARLES F. MEISSNER.

Copies of this patent may be obtained for five cents each, by addressing the "Commissioner of Patents, Washington, D. C."